April 9, 1940.  JEAN-BAPTISTE P. VAU  2,196,346
AUTOMATIC SERVO BRAKING FOR MOTOR VEHICLES
Filed July 19, 1938  5 Sheets-Sheet 1
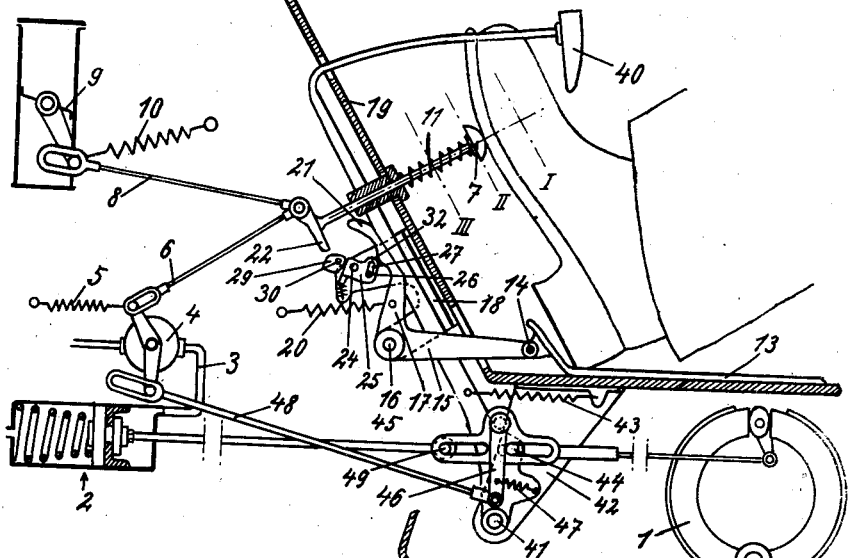
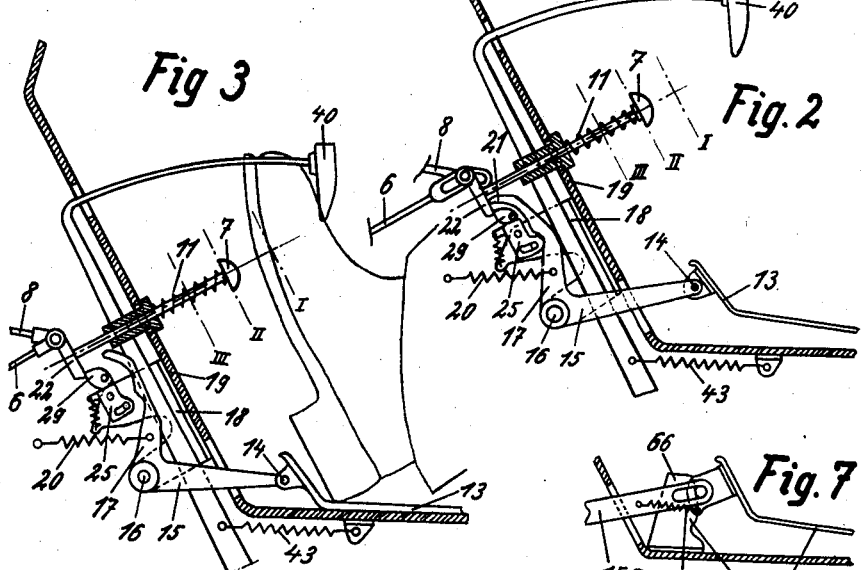
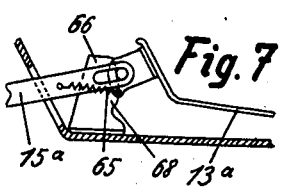
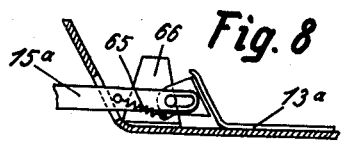
J. B. P. Vau
Inventor April 9, 1940. JEAN-BAPTISTE P. VAU 2,196,346
AUTOMATIC SERVO BRAKING FOR MOTOR VEHICLES
Filed July 19, 1938 5 Sheets-Sheet 2

J. B. P. Vau
Inventor
By: Glascock Downing &Seebold
Attys.

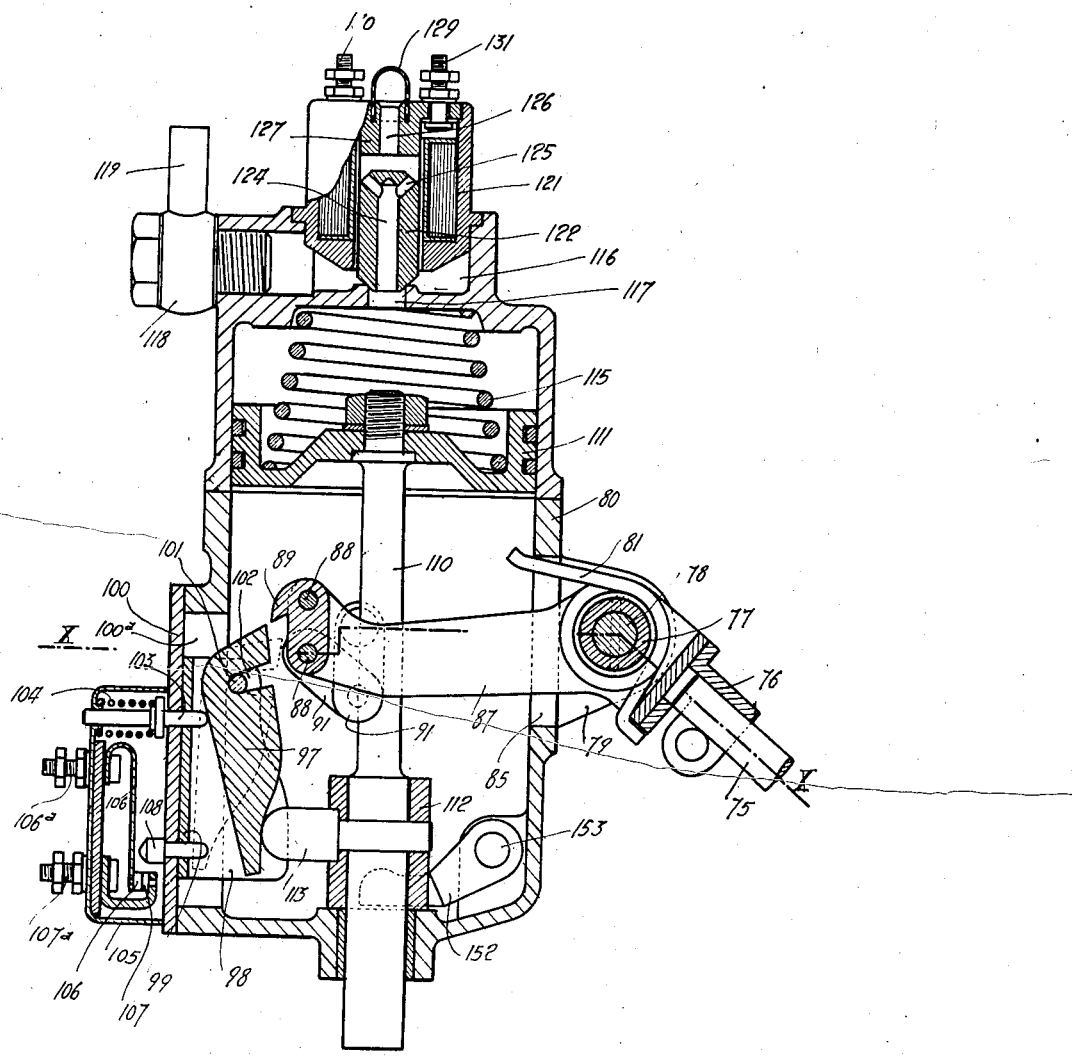

April 9, 1940. JEAN-BAPTISTE P. VAU 2,196,346
AUTOMATIC SERVO BRAKING FOR MOTOR VEHICLES
Filed July 19, 1938 5 Sheets-Sheet 4

J. B. P. Vau
Inventor

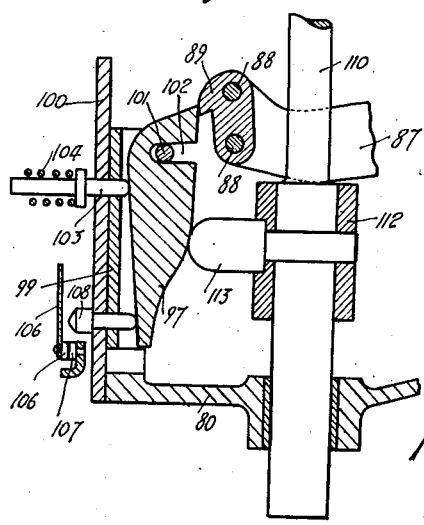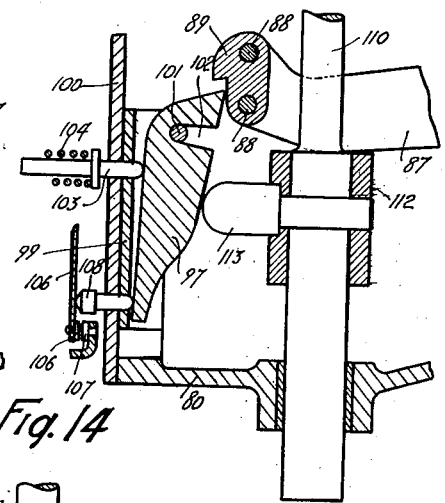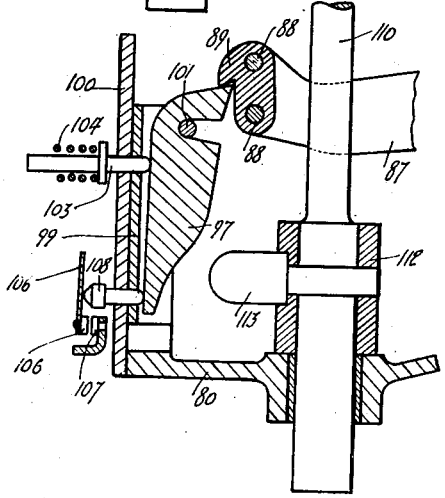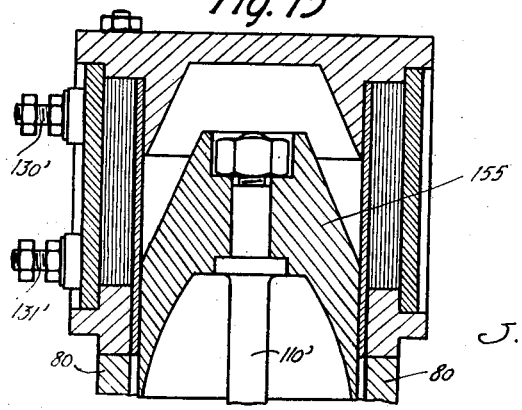

Patented Apr. 9, 1940

2,196,346

UNITED STATES PATENT OFFICE 2,196,346

AUTOMATIC SERVO BRAKING FOR MOTOR VEHICLES

Jean-Baptiste Paul Vau, Saint-Ouen, France

Application July 19, 1938, Serial No. 220,151
In France July 23, 1937

6 Claims. (Cl. 192—3)

The present invention relates to improvements in the servo braking device for motor vehicles in which a single pedal, controlled by the sole of the driver's foot, operates on the one hand, during a part of its stroke, the device regulating the feed to the engine, and on the other hand, during another part of its stroke, a servo-motor actuating the brakes, these latter being applied during the return of the said pedal to its rest position by the effect of a return force, produced for instance by a spring.

Such a device has a disadvantage due to the fact that if by reason of an improper reflex movement owing, for instance, to a lack of experience with the new device, or from any other cause, the driver's foot should suddenly leave the floor of the vehicle, the brake will be applied in an untimely manner. On the other hand, if the usual brake pedal has been left upon the vehicle, the use of this latter will afford an addition to the effect of the automatic braking, but in order to stop the braking entirely, it is necessary to again press down the combination pedal.

Moreover, if it is desired to allow the foot to rest by releasing the accelerator, it is necessary to eliminate the action of the automatic braking mechanism, and thus to operate a special handle mounted on the front board, and in order to restore the action of the automatic braking mechanism, this handle must be again operated.

The invention has chiefly for its object to obviate such drawbacks, and it is principally characterized by the fact that it consists of a mechanism for cutting off the automatic braking, which mechanism comprises a member, cooperating with any of the parts of the braking system in order to control the operating of the said system, this device being itself controlled by a movable member so arranged that the driver's heel will rest upon it when the foot is in the proper position for pressing down the pedal, and which is urged by a force which is contrary to the action of the foot upon the said movable member, the whole combination being so arranged that the braking system can only apply the brakes when the foot is resting upon the said movable member.

An improvement which is complementary to the preceding consists in the fact that this cut-off mechanism further comprises means which cooperate with any one of the other members of the said cut-off mechanism or of the braking device, in order to prevent the return movement of the said foot support from again placing the braking system in an operative position, and returning means which depend upon the combined pedal used for acceleration and braking, in order that this prolongation of the inoperativeness of the automatic braking system shall cease when the said pedal is again pressed by the foot.

This will prevent the occurrence of a sudden and undesired application of the brake if the driver should first place his heel upon the foot support without placing the sole of the foot at the same time upon the combination pedal. On the other hand, the combination pedal may be released, without any previous operation, in order to allow the foot to rest.

The value of the cut-off mechanism will be increased if, and this is another improvement comprised in the invention, the usual brake pedal of the vehicle has been preserved, as in this case the driver, who by reason of a recurrence of a customary reflex action, tries to brake by the medium of this usual brake pedal, will find this in its usual place and can brake the vehicle as if the automatic braking system did not exist. In this case, it is advantageous that this brake pedal be connected with the member controlling the operation of the servo brake by a lost motion connection, and preferably by means of a device adapted to divide the thrust of the foot into a direct force upon the brakes, and a force which is practically proportional to this thrust, upon the control leading to the servo-motor.

Obviously, the invention may be embodied in many various ways, and some embodiments will be described, thereafter by way of examples only.

In the accompanying drawings:

Fig. 1 diagrammatically shows an embodiment comprising the various improvements to be further set forth, the whole arrangement being represented in the position for the free operation of the automatic braking mechanism;

Figs. 2 and 3 are partial diagrammatic views of the embodiment shown in Fig. 1, and both show the automatic braking mechanism held inoperative by the cut-off mechanism, but in two different stages of operation;

Figs. 7 and 8 are views showing respectively, at two stages of its operation, an auxiliary device which may eventually be incorporated in the cut-off mechanism;

Fig. 9 shows in vertical section along line IX—IX of Fig. 10 a modified embodiment of the invention;

Figs. 12 to 14 illustrate a part of the device shown in Fig. 10 at various stages of its operation; and Fig. 15 shows a modification of the apparatus represented in Fig. 9.

Figure 4:
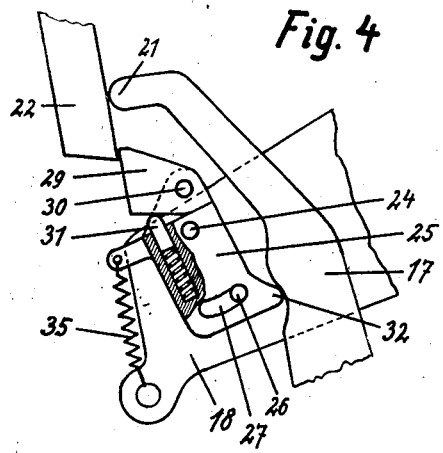
Fig. 4 is a view on a larger scale of a detail shown in Figs. 1 to 3.

In the various embodiments herein represented, 1 designates one of the vehicle brakes, 2 the servo motor device, including a piston which is connected with the brake and is movable against a spring in a cylinder communicating with a conduit 3 through which means, not shown, but known are capable of varying the pressure of a fluid in contact with one face of the piston, under the control of a member 4 such as a cock or other progressive throttling means, which is mounted on this conduit and serves to control the said pressure, i. e., the brake applying force developed by the servo brake.

In the embodiment shown in Figs. 1 and 2, the mechanism for automatic braking is of a known type in which the control member 4 is urged back by a spring 5 into the brake release position, as here represented, and is connected by a crank-arm carrying a pin, engaged in the slot of a slotted link 6, with a pedal 7. This latter is also connected by a slotted link 8, and a crank, provided with a pin engaged in the slot of said link 8, with the engine throttle 9 or like member for regulating the feed to the engine on the vehicle, which throttle is urged by a spring 10 to a position corresponding to the idling running of the engine. A spring 11, which is stronger than each of the springs 5 or 10, urges back the pedal 7 against the action of the foot upon the pedal, and the whole device is so arranged that for a mean position of the pedal (as shown in Fig. 1) the slotted part or guide of the link 6 which controls the braking, shall be in contact with the pin of the corresponding crank at the end of the said guide which is farthest from the pedal 7, the guide of the link 8 controlling the engine feed being in contact with the pin of the corresponding crank at the end of the guide which is nearest the pedal 7. It will thus be observed that when the pedal is pressed down, against the spring 11, in order to bring it from position II to position III, the link 8 will move the throttle 9 in the direction for its opening, while the guide of the link 6 will slide upon the corresponding pin, and the control member 4 remains stationary. During the return movement of the pedal 7 from position III to position II by the action of the spring 11, the guide of the link 6 will slide in the contrary direction upon its pin, while the spring 10 returns the throttle 9 to the position represented. When the spring 11 is allowed to bring the pedal from position II to the rest position I, the link 6 operates the control member 4 of the servo-motor 2, and this latter will enter into action with a gradually increasing force, while the member 9 remains stationary, the link 8 sliding upon the corresponding crank pin. Inversely, when the foot presses down the pedal 7 to bring it from position I to position II against the action of the spring 11, the spring 5 will bring the member 4 into the position represented, thus gradually decreasing the action of the servo brake, while the guide of the link 8 will slide upon the corresponding pin which returns to the position here represented.

In the embodiment of cut-off mechanism represented in Fig. 1, a movable plate 13 serves as a support for the heel of the foot, when this latter, as here represented, is in the proper position for pressing with the sole of the foot upon the combination pedal 7. At this time, the said plate rests flatwise, upon the floor of the vehicle. The said plate 13 is pivoted at its forward end to a horizontal pin 14 provided on an arm 15 carried by a horizontal stud 16 and is movable with another arm 17 also carried by said stud 16 which is supported by a bracket 18 secured under the front board 19, and a spring 20 urges the two arms 15 and 17 to turn about in such way that the plate 13 will no longer rest flatwise on the floor. The arm 17 is provided with a projecting end 21 arranged for cooperation with an extension 22 of the pedal 7 which is the member of the automatic braking system herein selected to be controlled by the cut off mechanism. The whole arrangement is so designed that when the plate 13 rests flatwise on the floor of the vehicle, the end 21 of the arm 17 will be out of the path of the extension 22 while the pedal is moving from the rest position II to the position I of full braking, but that it will be situated in this path, and quite near the position II when the arms 15 and 17 have turned by the action of the spring 20 and have thus brought the plate 13 into the position shown in Fig. 2.

It will thus be observed that when the driver's foot rests upon the plate 13, the automatic braking mechanism can operate freely, since nothing prevents the pedal from moving in both directions between the positions I and II under the control of the sole of the foot. On the contrary, when the foot no longer rests upon the said plate 13 (Fig. 2), this latter will rise by the action of the spring 20, the arms 15 and 17 will turn, and the extension 22 now makes contact with the end part or movable stop 21, thus preventing the pedal 7 from moving beyond the position II, the spring 20 being strong enough to overcome the action of the spring 11. The automatic braking mechanism is thus put out of use.

In order that when the foot is placed again upon the plate 13 without pressing at the same time upon the pedal 7, as shown in Fig. 3, the automatic braking mechanism shall not be released, the following device is provided (Fig. 4). Upon a pin 24 carried by the bracket 18 is pivoted a member 25 the stroke of which is limited by a pin 26 secured to the bracket and engaged in a slot 27 formed in the member 25. A pawl 29 is pivoted at 30 to the member 25, and its lower part is pressed against said member by a spring bolt 31 carried by the member 25 which is also provided with a projection 32, extending in the path of the arm 17, in order that said arm, when pivoting to return to its stop position when the plate 13 is released, will turn the member 25, thus bringing the pawl 29 into a position in which it will have the same effect as the arm 17, i. e., it will form a stop situated in the return path of one of the members of the automatic braking mechanism, which in this case is the extension 22 of the pedal 7. If the heel is now placed upon the plate 13 without pressing the pedal 7 with the sole of the foot (Fig. 3), the arm 17 will rock back, but the pedal 7 is kept stationary by the pawl 29 which prevents it from turning back beyond the position II, since the member 25 is stopped by the pin 26, and thus the automatic braking mechanism is kept inoperative. In order to render again operative the said mechanism there is provided a return spring 35 which tends to rotate the member 25 in the direction opposite to that of the rotation imparted to it by the arm 17. It is clear that the action of this spring 35 is controlled by the combination pedal 7, for when the pedal is pressed down, the extension 22 will move away from the pawl 29, thus allowing the member 25 to pivot about by the action of the spring 35, and to bring the pawl 29 out of the return path of the extension 22. The automatic braking mechanism will now be again capable of applying the brakes.

In order that the driver may eventually employ the usual brake control pedal 40 while at the same time using the servo-motor 2, the mechanism shown in Fig. 1 comprises the following device. The pedal 40, which is pivoted at 41 to a bracket 42 secured to the floor and is controlled by a return spring 43, carries a pin 44 engaged in a slide 45 which is interposed in the transmission between the servo-motor 2 and the brakes 1. To the said slide is pivoted a lever 46 which a spring 47 attached to said lever and to the pedal 40 maintains in the path of the pin 44 when the pedal 40 is pressed down, and the said lever 46 is connected by a link 48 provided with a slide and by a crank and pin, with the control member 4 of the servo-motor 2 in such way that this member 4, when it is in its rest position, may be operated by either of the links 6 or 48, the crank pin of the crank other than that through which it is moved at this time sliding idly in the corresponding slide. Moreover, the connection between the servo-motor 2 and the slide 45 is also made by a pin 49 engaged in the said slide so that when the brake pedal is pressed down, the slide 45 will slide upon the pin 49 without having any action upon the servo-motor 2.

The operation of the automatic braking mechanism and of the cut-off mechanism remains exactly the same as in the preceding case, for when the pedal 7 is moved in either direction between the positions I and II, the pin associated with the slide-rod 48 will move freely in its slide, while the transmission between the servo-motor and the brakes 3 will operate without the pin 49 sliding in the slide 45. As regards the cut-off mechanism, it is only connected with the automatic braking mechanism. Accordingly, when the foot is lifted from the plate 13, the cut-off mechanism will lock the automatic braking mechanism, but by pushing the pedal 40 with the foot, this pedal will turn about the shaft 41, thus causing the pin 44 to slide in the slide 45. The thrust now exerted by this pin upon the lever 46 can be decomposed into two forces which act respectively the one to turn the lever 46 against the spring 47 and the other to move the guide 45 while applying the brakes 1. The pivoting of the lever 46 causes, by means of the link 48 a displacement of the member 4 controlling the servo-motor 2, which thus comes into action and which,— through the medium of the pin 49—exerts upon the slide 45 a force which is added to the force directly applied to it by the pin 44; the value of the force thus produced by the servo brake will depend upon the value of the thrust of the foot upon the pedal 40, as in all the usual braking mechanisms. If for any reason the servo-motor 2 should not be in working condition, the slide 45 would move freely upon the pin 49, and the brake 3 would be operated only by the force of the foot upon the pedal 40. At all events, when the pedal 40 is released, the spring 43 will bring it into the rest position as shown in Fig. 1, the spring 47 will bring back the lever 46 and the link 48, and the control member 4 for the servo-motor 2 will now be returned to the rest position, by the spring 5, while the slide 45 will return to the position shown in Fig. 1 by the action of the usual return spring (not shown) of the brakes 1.

Figures 5, 6:
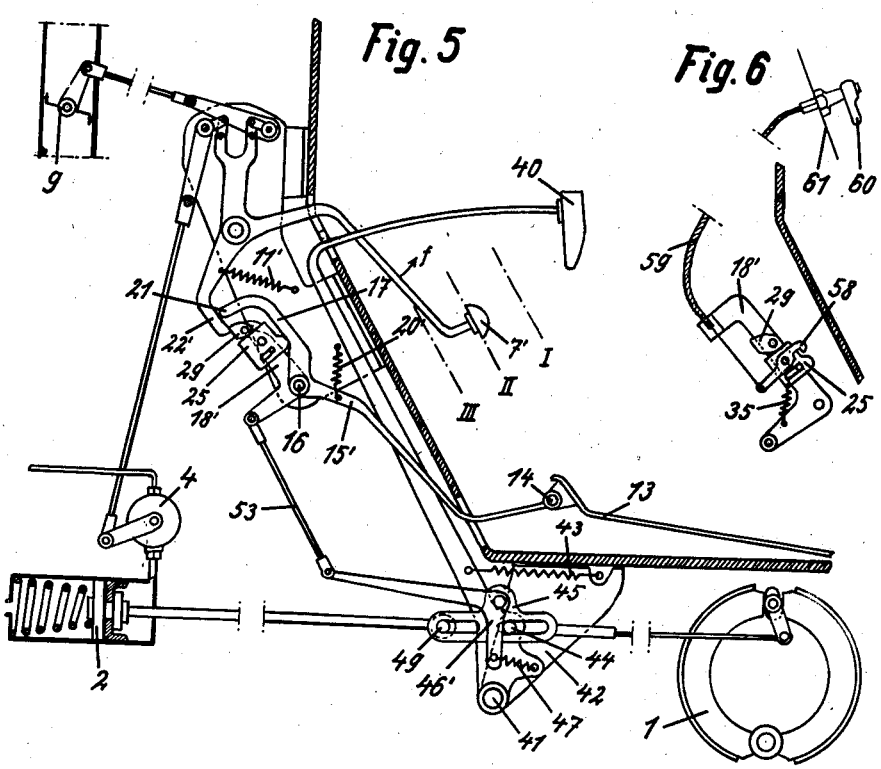
Fig. 5 is a diagrammatic view, similar to Fig. 1, of a modified embodiment.
Fig. 6 shows the addition, to the embodiment illustrated in Fig. 5, of an auxiliary device whereby the automatic braking mechanism may be kept inoperative, whatever be the position of the cut-off mechanism.
Figure 10:
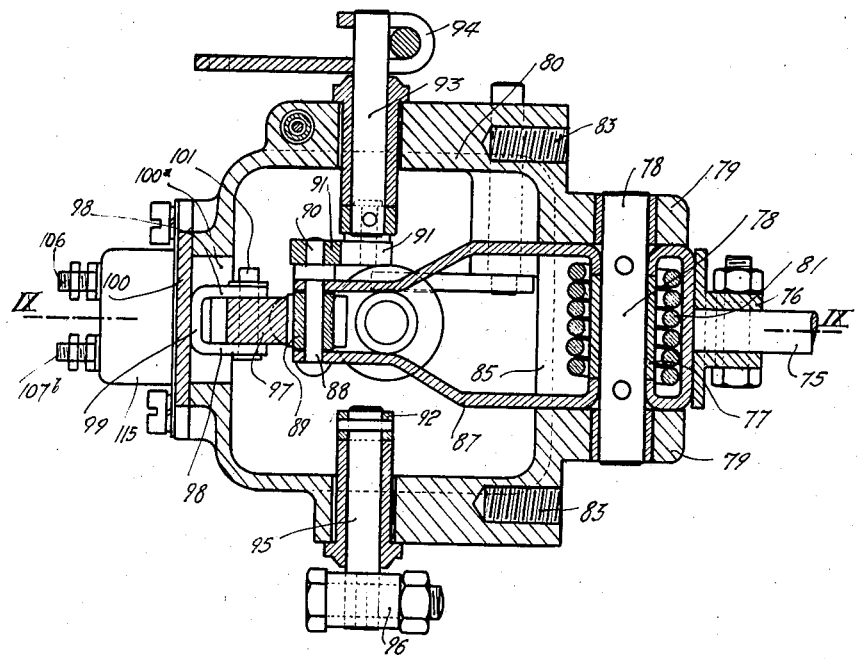
Fig. 10 is a cross-sectional view along line X—X of Fig. 9.

In the embodiment of Fig. 5, the mechanism for the combined control of the brakes and the engine differs from the one just described, by this that the combination pedal 7' is adapted for pivoting instead of for sliding, and that the transmissions between the combination pedal 7' and the devices 4 and 9 which control respectively the braking servo-motor 2 and the engine feed, are quite positive in both directions, and are of the type described in my co-pending application of August 17, 1937, Sal No. 159,582, but the movements of the members 4 and 9 in dependence on the movements of the pedal 7' are the same as above mentioned, the pedal 7' being urged to turn in the direction $f$ by its return spring 11'.

The cut-off mechanism differs also from the preceding only by the shape of the arm 15' and of the extension 22' of the pedal 7', and by the fact that the member 25 is not pivoted to a fixed bracket but to a movable carrier 18' which is here mounted on the pivot pin 16 of the arms 15' and 17. The mechanism for braking by the usual brake pedal 40 here comprises the same parts as are shown in Fig. 1, but the pivoting lever 46' is now connected with the carrier 18' by a link 53. When this lever 46' pivots about under the pressure of the pin 44 when the pedal 40 is pushed down by the pressure of the foot, the link 53 will rotate the carrier 18', thus moving the pawl 29 away from the extension 22', as well as the end part 21, since in this pivoting movement of the carrier 18', the member 25 will push upon the arm 17 to turn it against the action of its return spring 20'. Hence the pedal 7' can rise beyond the position II by the action of its return spring 11, and thus the automatic braking mechanism will come into action, not automatically in this case, but by the action of the foot upon the usual brake pedal 40. The value of the contribution given by this mechanism to the direct braking force due to the pedal 40, will depend upon the position taken by the pedal 7' between its end positions II and I, which position depends upon the position of the lever 46', i. e., upon the pression of the foot upon the pedal 40.

It will be noted that in the embodiment shown in Fig. 1, the servo-motor 2 and its control member 4 are the only parts of the automatic braking mechanism which are actuated when the pedal 40 is pressed down, the cut-off mechanism still holding the whole mechanism for the automatic braking, while in this case the pushing of the pedal 40 will counteract the effect of the cut-off mechanism and will provide for the operation of the whole of the automatic braking mechanism, but under the control of the pedal 40. When this pedal 40 is released, the spring 47 will bring back the lever 46', the link 53 and the carrier 18' into the position which they had before the pedal was pressed down, and the arm 17, by the effect of its return spring 20' will follow this movement of the carrier 18', without there having been at any time any such separation between the members 17 and 25 as would allow the member 25 to return to its rest position by the action of the spring 35. During the return movement of the arm 17, the end part 21 will turn the extension 22' in the contrary direction to f, and this will bring back the pedal 7' to the position II and will again put the automatic braking mechanism out of action, and this mechanism will only be entirely released by the simultaneous pressing of the pedal 7' beyond the position II, and of the plate 13, as in the case shown in Fig. 1.

If it should be desired to eliminate all action of the automatic braking mechanism, it is possible to use with the cut-off mechanism, a device which is shown in Fig. 6 as applied to the apparatus shown in Fig. 5. A catch 58 operated by a cable 59 from a handle 60 within reach of the driver, located for instance on the front board 61, is mounted on the carrier 18' of the member 25 in such way that by a traction upon the cable 59 it will hold the member 25 in its stop position and will prevent it from turning aside by the action of the spring 35. It will be observed that in the devices above described, the weight of the driver's foot and leg will alone act upon the plate 13 in order to hold it down, to the exclusion of any lengthwise thrust of the leg, as the pivot pin 16 of the arms 15 and 17 is substantially in line with such thrust. It is eventually possible to make use of a longitudinal thrust of the leg to contribute to hold the plate 13 in its lowered position, by placing the said pivot pin 16 in a sufficiently high position in order that a thrust of this kind will produce a substantial torque relatively to said pin.

On the other hand, in order that the plate 13 shall not exert an excessive lifting force upon the foot, use may be made of a device such as is represented in Figs. 7 and 8, and this can be employed whatever be the construction employed for the automatic braking mechanism and the cut-off mechanism. In this device, the plate 13a is connected with the arm 15a by a pin engaged in a slide, and a spring 65 which is stretched between the said arm and plate will urge the said plate against an inclined member 66 having at its lower part a notch 68, and thus when the said plate is engaged in the notch, the lifting force of the spring 20 or 20' is counteracted for a great part by the upper edge of this notch, and hence the remaining force which is imparted to the foot may be as reduced as desired, whatever be the force of the spring 20 or 20'.

Obviously, the invention is not limited to the details of construction herein described or represented. Thus it is chiefly to be noted that instead of using the combination pedal as the part of the automatic braking mechanism which is actuated by the cut-off mechanism, it is possible to make use of any other part, such as the control member of the servo-motor, or even the servo-motor itself, by combining with the latter a cock or valve the opening of which only will be produced by the cut-off mechanism as the plate 13 is being raised, the plate 13 releasing at the same time a device allowing the said cock or valve to be closed when the combination pedal is subsequently pushed down. Moreover, the transmissions between the movable plate of the cut-off mechanism and the parts of this mechanism which act directly upon the automatic braking mechanism can be assured by electric, pneumatic or hydraulic means, or by combinations of the same. The same will prevail as concerns the connections between the automatic braking mechanism, the usual brake pedal, and the cut-off mechanism.

Figure 11:
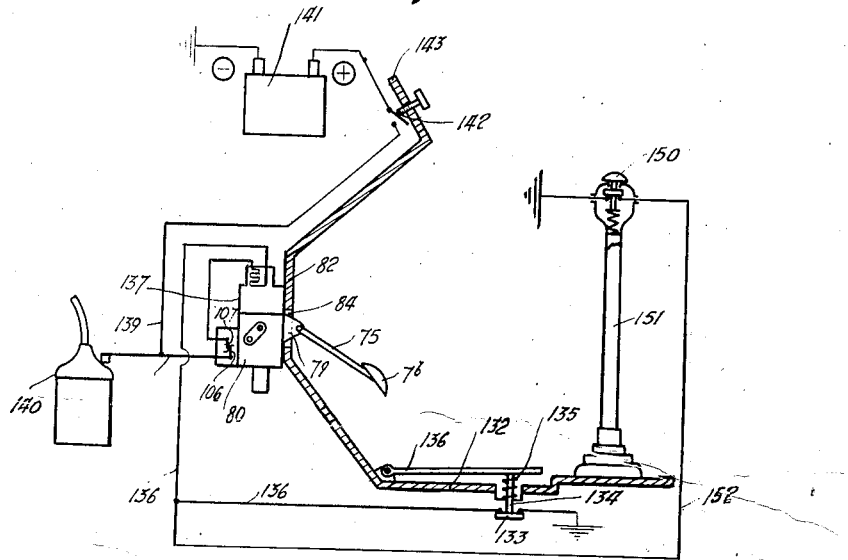
Fig. 11 is a diagrammatic view of the arrangement on a motor car of the cut-off mechanism illustrated in Fig. 9.

In the embodiment shown in Fig. 9, the combination pedal 7b (Fig. 11) is carried by a rod 75 fitted at one end into a collar provided with a socket 77 secured on a horizontal stud 78 which is carried by two outer flanges 79 of a casing 80. The said rod 75 is urged in rotation in the direction f by a torsion spring 81 which serves as the return spring for the pedal 7b. The casing 80 is mounted on the front part of the scuttle 82, as shown in Fig. 11, by means of screws passing through holes in the scuttle and engaged into tapped holes 83 on the rear side of the casing 80, the flanges 79 projecting through an aperture 84 in the scuttle. The casing 80 is provided with an aperture 85 located between the two flanges 79, and a member 87 extends through the said aperture into the casing 80 which member consists of a U-shaped piece of sheet metal whose two branches are traversed, near their base, by the stud 78 to which they are secured. At their free ends, the two branches are connected together by screws 88 which also pass through a hook 89 located between the ends of these two branches. The two screws 88 are terminated, one on one side of the U, and the other on the opposite side, by a smooth part 90, which serves as a pivot for a toggle joint 91, 92. The toggle joint 91 is secured on the other hand to an end of a horizontal pin 93 which extends through the lateral face of the casing 80. On the part of the pin 93 which extends outside of the casing 80 is secured a lever 94 which is connected by any means, not shown, to the throttle of the carburettor. Likewise the second toggle joint 92 is secured on an end of a pin 95 similar to the pin 94, but which extends through the opposite wall of the casing 80 and on the outer end of which is secured a lever 96 which is connected, by any means, with the member controlling the servo-motor used for the braking. In register with the hook 89 is provided a pawl 97 located between the two flanges 98 of a U-shaped support which is secured by its back part 99 to a closing plate 100 adapted to close an opening 100a in the side of the casing, opposite the aperture 85. The pawl 97 is simply suspended from a pin 101 which is carried by the flanges 98 and extends through a slot 102 in the pawl 97. At the rear of the said pawl is provided a slidable rod 103 which extends through the plate 100 and the back part 99 of the support of the pawl, and a spring 104 urges the said rod against the back of the pawl 97. At the exterior, the cover plate 100 carries a contact box 105 of the known automobile type, containing two contact-pieces 106 and 107, which are connected to two respective external terminals 106a and 107a. A push piece 108 made of insulating material projects inside said box 105 and is provided with an extension which passes through the plate 100 and the back part 99 of the pawl support, and whose end projects between the flanges 98 of the said support.

At the centre of the casing 80 is provided a vertical rod 110 which passes between the branches of the U-shaped piece 87, and which carries at its upper end a piston 111 fitted in the separately-secured upper part of the casing 80; at its lower part, the said rod 110 passes through a guiding hole in the said casing, and rests upon the wall of the casing by means of an enlarged part 112. A transverse pin 113, which is mounted at the lower end of the said rod, and whose head is engaged between the flanges 98, prevents the rod from turning. Between the piston 111 and the upper end of the casing 80 is provided a return spring 115 for the piston. A recess 116 is formed in this end, and it is connected by an aperture 117 with the interior of the casing 80; it is also connected by a coupling piece 118 and a conduit 119 with the suction pipe of the engine of the car. In the upper wall of the recess 116 is formed an aperture into which is fitted an electro-magnet 121 whose core is in register with the hole 117 and comprises a lower movable part 122; the end of said movable part has such shape that it can close the aperture 117 and thus serve as a valve. The said member 122 is further provided with an axial bore 124 which opens at its lower end but is blind at the upper end; inclined vents 125, however, connect the said bore 124 with the periphery of the upper end of the member 122. The central part of this upper end is adapted to close a hole 126 which extends through the stationary upper part 127 of the central core of the electro-magnet, and communicates with the atmosphere. A small perforated cap 129 covers the outer end of the said hole 126. The electro-magnet 121 is further provided as usual with terminals 130 and 131 for the supply of current.

On the other hand (Fig. 11), below the plate 13b which is directly pivoted at its front end to the floor 132 of the vehicle, is provided an electric switch 133 comprising a push rod 134 which extends through the floor and is urged upwardly by a spring 135. The said spring is sufficiently strong to hold up the plate 13b, which rests constantly upon the said rod 134. The switch 133 is provided in a wire 136 leading from one terminal 130 of the electro-magnet 131, to earth. The other terminal, 129, of the electro-magnet is connected by a wire 137 to the terminal 106 of the contact-box 105, whose other terminal 107 is connected by a wire 138 to the supply cable 139 connecting the ignition coil 140 to the storage battery 141 through the medium of the usual ignition switch provided on the instrument board 143.

The operation is as follows: when the sole of the driver's foot presses upon the plate 13b, he pivots it downwardly to a slight degree against the spring 135, thus driving in the push rod 134 and opening the switch 133. No current can then flow in the wires 138 and 136. If his heel should leave the said plate 13b, the spring 135 will slightly raise this plate 13b and also cause the switch 133 to close. As the ignition switch 142 is closed, current will now flow through the wire 138, the contact-pieces 106 and 107 which are in engagement, the wire 137, the electro-magnet 121 and the wire 136. The lower movable part 122 of the electro-magnet core will now raise, thus closing the aperture 126 and opening the hole 117 and suction will be exerted, through the pipe 119, upon the piston 111, thus raising it against the spring 115. At the beginning of this movement of the rod 110, the stud 113 in contact with the cam-shaped edge of the pawl 97 will drive the latter against the push-piece 103, as shown in Fig. 12, owing to the fact that the pawl is prevented from pivoting about, due to the contact between its end and the hook 89. The shoulder 112 then makes contact with the under side of the member 87, thus lifting it as well as the hook 89 which will thus be moved out of engagement with the pawl 97 (Fig. 13). Owing to the thrust of the push rod 103, the pawl 97 now turns about its point of contact with the pin 113, its head comes below the hook 89, and its lower end drives out the push piece 108, thus separating the contact pieces 106 and 107 (Fig. 13). The circuit of the electro-magnet 121 being thus broken, the movable core 122 falls and closes the hole 117, thus cutting off the connection between the cylinder of the piston 111 and the suction conduit 119, while at the same time uncovering the aperture 126, thus connecting the said cylinder with the atmosphere. Yet, the piston 111 and the rod 110 will fall due to the thrust of the spring 115. The pedal 7b and the member 87, which are urged back by the spring 81, now tend to pivot about in the direction f, but the pawl 97, being now in the path of the hook 89, will stop this latter (Fig. 14), thus preventing the pedal from returning to its rest position. The thrust of the hook 89 upon the end of the pawl 97 will now urge this latter to turn about the pin 101, and thus the lower end of the pawl will hold the push piece 108 in the position where the contacts 106 and 107 are out of engagement. The automatic braking mechanism is thus held out of action, and no current is flowing in the electro-magnet 121.

If the driver should again push down the plate 13b with his heel, the contact 133 will now open, but no other effect will take place, as no current is flowing in the wire 136 owing to the separation between the contact pieces 106 and 107, and hence the automatic braking mechanism remains out of action.

On the contrary, when again pressing with the sole of the foot upon the combination pedal 7b, the driver will cause it to turn, together with the member 87, in the direction contrary to f, thus raising the hook 89 and releasing the point of the pawl 97. This latter will then turn about the pin 101 by the action of the push-piece 103, so that its point will come outside of the path of the hook 89 and its lower end will release the push piece 108. The contact pieces 106 and 107 then come back into engagement and drive back the push-piece 108. If at this time the driver's foot is not again placed upon the plate 13b, the above mentioned operation will be repeated, in order to prevent the automatic braking mechanism from working, as soon as the pedal 7b moves beyond its mean position to enter the region in which it controls the braking.

It will thus be understood that it is only by the simultaneous pressing of the sole of the driver's foot upon the pedal 7b, and of his heel upon the plate 13b that the automatic braking mechanism can be released and made ready again for further action.

Fig. 11 also represents an auxiliary device which serves to facilitate the control of the speed-changing box. The said device comprises a push-button switch 150 which is provided on the speed-changing lever 151 and is in the circuit of a wire 152 which is connected between earth and a point of the wire 136 located between the electro-magnet 121 and the switch 133. The said switch 150 is normally open, but will close by the pressure of the hand when it seizes the lever 151 in order to operate the gear box. By this closing, a current will flow in the electro-magnet 121, and the mechanism for placing the automatic braking device out of action will operate as if the switch 133 had been closed.

The apparatus shown in Fig. 9 further comprises within the casing 80, a fork 152 which is engaged in a groove in the enlarged part 112 and is carried by a shaft 153. Said shaft is connected by means, not shown, with a handle provided on the instrument board, in such way that when the handle is turned, this will turn the shaft 153 and the fork 152, thus raising the rod 110 and placing the automatic braking mechanism out of action.

In Fig. 15, which shows a modification of the apparatus represented in Fig. 9, the rod 110' is secured directly to the movable part 155 of the core of an electro-magnet 156 which is placed upon the upper part of the casing 80 and is supplied with current by the terminals 130' and 131' which are connected in the same way as the terminals 130 and 131 of the electro-magnet 121.

What I claim is:

1. With control means of both the engine running and the brakes in a motor car, of the type including a pedal adapted for reciprocal rocking motion about a substantially horizontal axis, a return spring urging said pedal into a rest position, a brake applying mechanism including servo-power means and a movable member adapted to control the brakes applying force supplied by said servo-power means, a motion transmitting contrivance from said pedal to said movable member so arranged that the brakes will be applied when the pedal is in its rest position, a means adapted to determine the rate of supply of power creating fluid to the engine and including a control member and a motion transmitting contrivance from said pedal to said control member, said motion transmitting contrivances being arranged for successive control of the brakes and of the engine running as the pedal is being rocked away from its rest position in one and the same direction, the combination of a cut-off mechanism including a movable control member forming a support for the heel of the driver's foot in its operative position to actuate said pedal, means urging said control member against the action thereon of said heel and a means adapted to control said brake applying mechanism and operatively connected to said movable control member to be actuated thereby so that it will prevent said brake applying mechanism from applying the brakes, i. e. said mechanism will be inoperative, when the driver's heel does not rest upon said movable control member.

2. The combination as in claim 1, wherein the said means adapted to control the brake applying mechanism is also operatively connected to the pedal so that it will depend upon the movable control member only to render inoperative the brake applying mechanism and upon both said movable control member and said pedal to make it again operative.

3. The combination as in claim 1 wherein said means adapted to render inoperative the brake applying mechanism includes a movable member permanently connected to the movable control member to permanently have a position depending upon that of said movable control member, locking means adapted to lock said brake applying mechanism in its inoperative position, and means whereby said locking means are made dependent upon the position of said movable control member so as to remain inoperative when said movable control member is depressed by the driver's heel and to lock said brake applying mechanism against operation upon motion of said movable control member to cut-off the brake applying mechanism.

4. The combination as in claim 1 wherein said means adapted to control the brake applying mechanism includes an electro-magnet, current supplying means to the latter, said current supplying means including switch means arranged to be operated by said movable control member so as to be open when the latter is depressed by the driver's heel and otherwise closed, and contact means, and means responsive to the operation of said cut-off mechanism to operate said contact means to cut-off the supply of current to said electro-magnet upon the brake applying mechanism being made inoperative.

5. The combination as in claim 1 wherein the brakes applying mechanism includes a one-way connection between the servo power means and the brakes, the usual brake applying pedal, and a one-way connection between said pedal and the brakes.

6. The combination as in claim 1 wherein the brakes applying mechanism includes a one-way connection between the servo power means and the brakes, and said motion transmitting contrivance from the pedal to the control means of the servo power means includes a one-way connection, the usual brake applying pedal, a one-way connection between said latter and the brakes, and a one-way connection between said usual brake applying pedal and said control means of the servo power means.

JEAN-BAPTISTE PAUL VAU.